United States Patent [19]

Mohan et al.

[11] 4,242,628
[45] Dec. 30, 1980

[54] WIND ENERGY CONVERSION SYSTEM

[75] Inventors: Narendra Mohan; Mahmoud Riaz, both of Minneapolis, Minn.

[73] Assignee: The Regents of the University of Minnesota, Minneapolis, Minn.

[21] Appl. No.: 910,204

[22] Filed: May 30, 1978

[51] Int. Cl.³ .......................... F03D 9/00; H02P 9/04
[52] U.S. Cl. ........................... 322/35; 322/47; 322/95; 290/44; 290/55
[58] Field of Search ............ 322/35, 47, 89, 90, 322/95, 96; 290/44, 55

[56] References Cited

U.S. PATENT DOCUMENTS

| 2,178,679 | 11/1939 | Claytor | 322/35 X |
| 2,758,272 | 8/1956 | Franklin | 322/96 X |
| 2,871,439 | 1/1959 | Shaw | 322/47 |
| 3,043,115 | 7/1962 | Harter | 322/47 X |

FOREIGN PATENT DOCUMENTS 518139 11/1955 Canada ............................ 290/44
2250730 8/1975 France ............................ 290/44

OTHER PUBLICATIONS

"Induction Motors as Generators," T-A. O. Gross, *Machine Design*, Mar. 23, 1978, pp. 77–79.
IEEE *Spectrum*, "Windmills Stage A Comeback", Jayadev, Nov. 1976, pp. 45–47.

*Primary Examiner*—Robert J. Hickey
*Attorney, Agent, or Firm*—Peterson, Palmatier, Sturm & Sjoquist, Ltd.

[57] ABSTRACT

A wind turbine drives the squirrel-cage rotor of a capacitively excited induction generator. The amount of excitation is controlled in accordance with the output voltage of the stator and hence the speed of the wind turbine. The generating system is capable of operating at high efficiency over a wide speed range, since the electrical output frequency is allowed to vary with the rotor speed. The electrical power supplied by the induction generator is used for heating purposes within a nearby building.

15 Claims, 3 Drawing Figures

WIND ENERGY CONVERSION SYSTEM

BACKGROUND OF THE INVENTION

1. Field of the Invention

This invention relates generally to a system for converting wind energy into electric power, and pertains more particularly to a system in which a capacitively excited induction generator is driven by a wind turbine, the generator supplying a resistive heating load.

2. Description of the Prior Art

Conversion of wind energy into electric power is, of course, not new. Prior art systems can be broadly classified into three categories: (1) Constant-speed, constant-frequency system; (2) Variable-speed, constant-frequency system, and (3) Variable-speed, variable-frequency system.

The constant speed, constant-frequency system requires that the rotor speed be maintained constant by controlling the pitch angle of the turbine blades. This in turn will result in a constant electrical frequency if the blade adjustment is correct for the various wind speeds that are encountered. This arrangement may be necessary in installations employing very large blades where allowing the rotor speed to vary over a wide range might risk mechanical resonance. Unfortunately, the mechanical efficiency of the wind turbine, owing to the varying of the blade pitch, cannot be kept at its maximum value.

The variable-speed, constant-frequency system permits the turbine speed to vary with the wind speed, but at the same time requiring that a constant electrical frequency be maintained. In such arrangements, the generated alternating current is converted or rectified into direct current, and the direct current in turn inverted or reconverted to alternating current, the frequency usually being 60 Hz so that this type of system can be synchronized with and connected to existing power lines.

Other attempts have been made as far as producing systems having a constant frequency. However, they have all, as far as we know, required rectification and inversion in order to provide the requisite alternating current frequency.

The variable-speed, variable-frequency system is ideal where frequency insensitive heating loads are to be supplied with power. Since the frequency of the power furnished to resistive loads is not a factor to contend with, wind-generated alternating current, whatever its frequency due to the wind velocity at that particular moment, can be supplied directly to a heating load of this character. Studies, it might be pointed out, have indicated that in a residential home, a significant portion of the energy that is used is consumed for space heating and hot water heating. In such cases, wind energy is expected to find greater and greater economical application for supplementing the normal utility-supplied power (or the thermal power derived directly from fuel oil or propane gas, as the case may be) as fossil fuel costs continue to rise. Since the amount of wind energy is not constant at all times, reliance on fossil fuels cannot be entirely eliminated by utilizing wind power, but an appreciable reduction in their consumption can be achieved.

SUMMARY OF THE INVENTION

Accordingly, a general object of our invention is to reduce the consumption of fossil fuels by supplying at least a portion of a domestic heating load with wind-generated electric power. More specifically, an aim of the invention is to convert the wind energy into alternating current power having whatever frequency the wind speed produces and supply such variable frequency electric power directly to electric heating elements. When practicing our invention it is planned that the electric power be generated close to the home and delivered into the home without being transmitted over utility-operated power lines where the proper frequency is essential.

Another object of the invention is to provide a wind conversion system that will be relatively low in initial cost, and entailing virtually no operating expense, thereby encouraging its adoption where the voltage and frequency does not require regulation and average wind velocities are adequate.

Yet another object is to provide a system of the foregoing character which is exceptionally rugged and which will require little or no attention after installation.

Still further, an object of the invention is to provide a system utilizing a capacitor excited induction generator which can be coupled to or driven by various types of wind motors or wind turbines.

A further object of the invention is to provide an energy conversion system utilizing a wind turbine and induction generator that will operate at a high efficiency despite large variations in turbine speeds. In this regard, it is an aim of the invention to allow the electrical output frequency to vary with the turbine speed in contradistinction to a fixed frequency system which operates at a high efficiency only during a very restricted speed range.

Another object of the invention is to provide a system in which the power output is maximized for whatever wind energy is available. In this regard, it is intended that a squirrel-cage induction machine be operated as a generator with a simple capacitor excitation which can be readily adjusted for different wind conditions. More specifically, it is planned that the load resistance be kept fixed and that the excitation be automatically controlled in accordance with the then-occurring wind velocity.

A further object of the invention is to provide a generating system making use of wind power which is relatively compact.

Yet another object is to provide a system of the foregoing character utilizing a wind turbine and squirrel-cage induction machine assembly that can be mounted atop a tower in order to take advantage of the greater wind speeds existing at greater heights where obstructions to the moving air are less or non-existent.

For still another object, the invention contemplates the placing of the excitation capacitors for the tower-mounted induction generator and the associated control circuitry of whatever location proves most convenient.

Also, an object is to prevent overloading of the generator caused by excessive wind speed, as well as loss of self excitation when the speed falls below a predetermined minimum.

Briefly, our invention comprises a wind turbine to which is coupled a squirrel-cage induction machine, the wind turbine driving it as a generator. The generator is capacitor excited, the degree of excitation being automatically varied to maximize the electrical power output. The frequency of the electrical output is governed primarily by the rotor speed of the wind turbine. In that the electrical frequency is defined at a given operating speed of the turbine, provision is made for adjusting the magnitude of the output voltage by controlling the capacitor-excitation. In order to maximize the power output, the invention utilizes a control or error signal derived by comparing the generator output with a desired maximum or reference voltage. The control signal is then used in the firing of triacs, each triac being in series with an inductor and the serially connected triac and inductor being in parallel with an excitation capacitor. Since the inductor current is essentially 180 degrees out of phase with the capacitor current, the controlling of the inductor current determines the amount of effective excitation current for the induction generator because the inductor current is vectorally subtracted from the capacitor current.

Provision is made for isolating the induction machine from both the excitation capacitance and the resistive load by means of a disconnect switch whenever the turbine speed exceeds a predetermined maximum. Similarly, when the speed drops below a predetermined minimum value, the switch is opened. Thus, a safeguard is incorporated into our system with respect to both an appropriate cut-out speed and a proper cut-in speed. In this way, the generator is prevented from becoming overloaded at high speed, and loss of residual magnetism with an accompanying loss of excitation is avoided when the speed becomes too low. Residual magnetism must be maintained, it will be appreciated, in order for the generator voltage to build up when the wind speed is adequate for power generation.

DESCRIPTION OF THE PREFERRED EMBODIMENT

Figure 1:
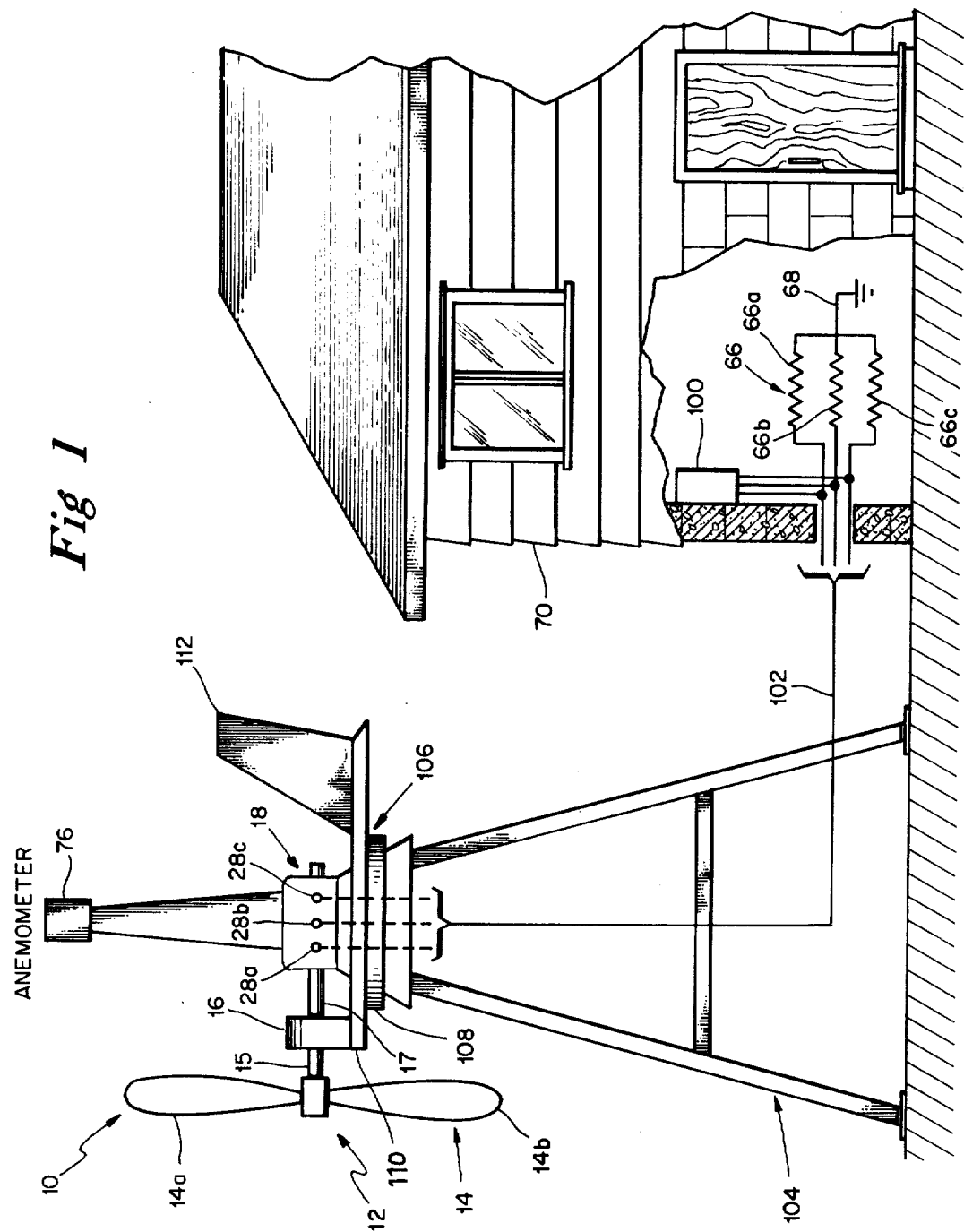
FIG. 1 is an elevational view showing our wind energy conversion system used for electrically heating part of a home.

A wind energy conversion system exemplifying our invention has been denoted generally by the reference numeral 10. The system 10 comprises a wind motor or wind turbine 12 which includes a propeller 14 composed in the illustrated instance of two separate blades 14a and 14b mounted at one end of a horizontal drive shaft 15. The drive shaft 15 extends into a gear box 16 which has a driven shaft 17 extending therefrom.

As the description progresses, it will become apparent that the particular type of propeller is not critical to a practicing of our invention. Thus, while a two-blade propeller 14 has been depicted, a multi-vane fan or conventional farm type of windmill can be utilized, particularly for the generation of relatively small amounts of power, namely, on the order of five kilowatts or so. Even vertical-axis wind motors or turbines can be employed. However, a propeller with two (as pictured) blades or three blades rotating at high speeds has a much higher aerodynamic efficiency than a fan with wide blades. Also, the material of which the blades 14a, 14b are constructed is utilized more efficiently. Consequently, two or three thin blades, such as the blades 14a and 14b, are preferred.

Inasmuch as the power that is converted from wind energy to electric power depends upon the mass of air per unit of time crossing the area defined by the blades 14a, 14b, the distance from the tip of the blade 14a to the tip of the opposite blade 14b is selected so as to make use of the requisite mass of air for the expected average wind velocity and the amount of electric power to be generated. Propellers, such as the propeller 14, having a tip-to-tip distance of approximately 25 feet are contemplated.

An induction machine 18 is operated as a generator, the generator having a squirrel-cage rotor 20 and a polyphase stator 22; the stator 22 comprises three-phase windings 22a, 22b and 22c. The squirrel-cage rotor 20 is coupled to the propeller 14 via the shafts 15, 17 and the gear box 16 therebetween; hence, the rotor 20 is driven at a higher speed from that of the propeller 14.

Figure 2:
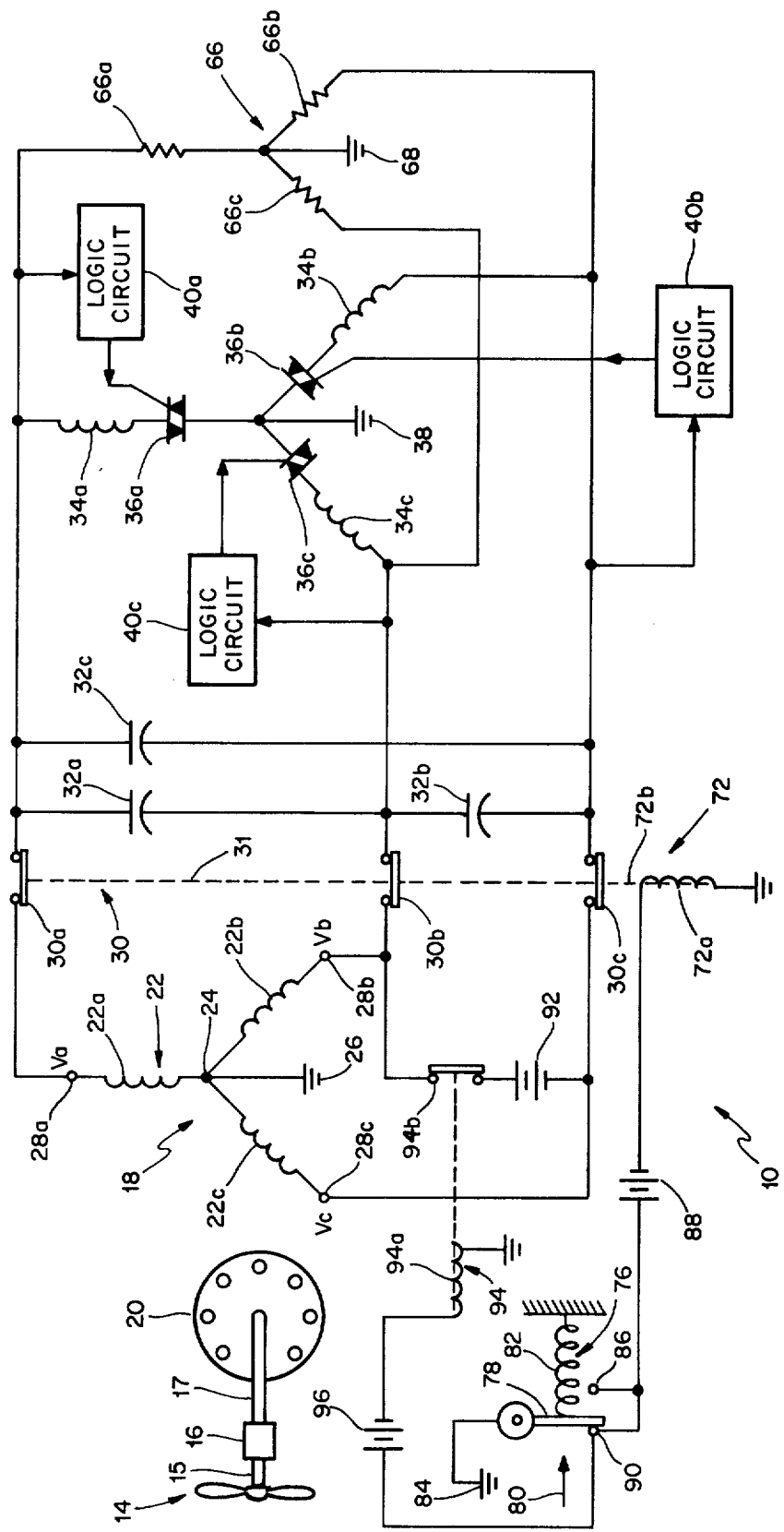
FIG. 2 is a schematic representation of the system shown in FIG. 1.

It can be discerned from FIG. 2 that the windings 22a, 22b and 22c are Y-connected, one end of each winding being joined at 24; the neutral or common connection 24 is grounded at 26. The other ends of the various windings 22a, 22b and 22c are provided with output or load terminals 28a, 28b and 28c respectively.

An electromagnetically operated circuit breaker 30 in the form of a three pole switch includes switch controls 30a, 30b and 30c, the contacts 30a, 30b and 30c being actuated in unison by an actuating rod 31. The electromagnetic operator for the rod 31 will be referred to hereinafter. At this stage, however, it can be explained that the rod 31 is actuated in a direction to open the switch contacts 30a, 30b and 30c when a predetermined wind speed is encountered so as to prevent overloading of the generator 18, the switch contacts 30a, 30b, 30c being connected to the terminals 28a, 28b and 28c, respectively.

Capacitors, one for each of the three phases, utilized in exciting the machine 18 have been labeled 32a, 32b and 32c. These capacitors 32a, 32b and 32c are deltaconnected. More specifically, the capacitor 32a is connected between the switch contacts 30a and 30b, and hence to the load terminals 28a and 28b when the switch contacts 30a, 30b are closed, the capacitor 32b is connected between switch contacts 30b and 30c, and hence to the load terminals 28b and 28c when the switch contacts 30b, 30c are closed, and the capacitor 32c is connected between the switch contacts 30a and 30c, and hence to the load terminals 28a and 28c when the switch contact 30a and 30c are closed.

An inductor or coil 34a has one end connected to the switch contacts 30a and its other end in series with a triac 36a, the triac 36a being grounded at 38. Similarly, a serially connected inductor 34b and triac 36b are connected between the switch contacts 30b and ground 38. An inductor 34c is connected in series with still another triac 36c, this combination being connected between the switch contacts 30c and ground 38.

Whereas the capacitors 32a, 32b and 32c are connected in delta, the inductor-triac combinations 34a and 36a, 34b and 36b, 34c and 36c are Y-connected, just as are the stator windings 22a, 22b and 22c.

By controlling the times at which the various triacs 36a, 36b and 36c fire or become conductive, the amount of current flowing through the inductors 34a, 34b and 34c is varied. Owing to the fact that the current through the inductors 34a, 34b and 34c is for all intents and purposes 180 degrees out of phase with the current flowing through the capacitors 32a, 32b and 32c, it follows that the inductive current is vectorally subtracted from the capacitive current. Consequently, by varying the inductor current by way of the triacs 36a, 36b and 36c, this being done continuously during normal operation as will soon be come apparent, the amount of excitation for the generator 18 is constantly adjusted to an optimum value. Although generally understood, it can be pointed out at this time that a triac is equivalent to two silicon controlled rectifiers (SCR's) connected back to back. The phase voltages with respect to the neutral 24 at the terminals 28a, 28b and 28c have been identified by the letters $V_a$, $V_b$ and $V_c$.

Identical control circuitry in the form of logic circuits 40a, 40b and 40c determine the times at which the various triacs 36a, 36b and 36c, respectively, are fired or rendered conductive, and hence the magnitude of the voltages $V_a$, $V_b$ and $V_c$. The logic circuit 40a has been schematically detailed in FIG. 3. As already pointed out, the control circuits 40a, 40b and 40c are identical and therefore only one need be described in any detail.

Figure 3:
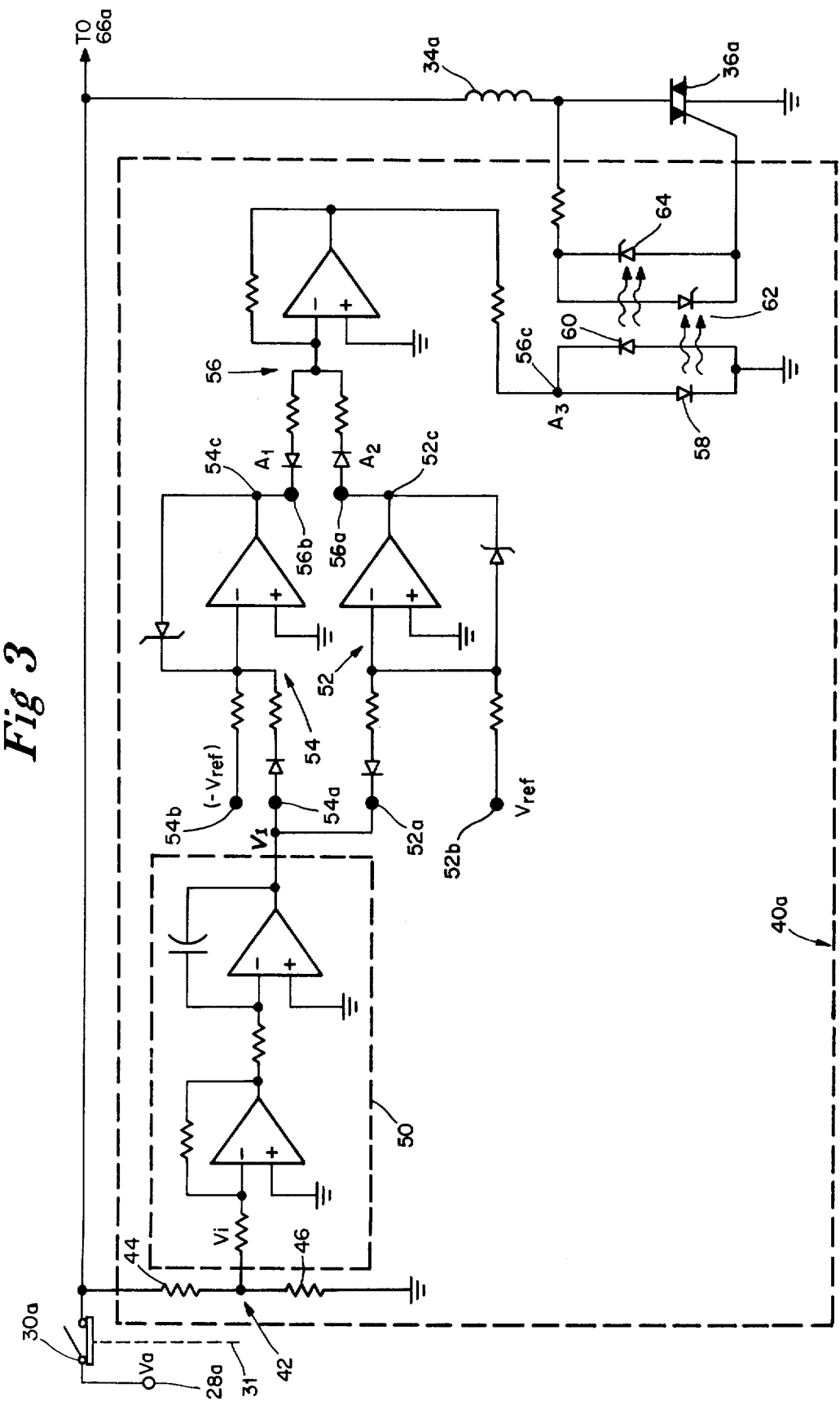
FIG. 3 is a schematic diagram of one of the three logic circuits utilized in controlling the generator excitation.

Describing the control circuit 40a in FIG. 3, it will be seen that it comprises a voltage divider 42 including resistors 44 and 46, resistor 44 having a relatively large resistance and resistor 46 having a much smaller resistance. The upper end of the resistor 44 is connected to the switch contacts 30a, and hence to the load terminal 28a when the circuit breaker 30 is closed. The lower end of the resistor 44 is connected to the upper end of the resistor 46, whereas the lower end of the resistor 46 is grounded at 48. In this way, $V_i$ represents only a small fraction of the output voltage $V_a$.

The smaller voltage $V_i$ is delivered as an input signal to the input side of a non-inverting integrator 50, and the output voltage $V_I$ from the integrator 50 is phase-shifted through 90 degrees with respect to the voltage $V_i$.

The output voltage $V_I$, which varies in accordance with the magnitude of the load voltage $V_a$, is compared with two preset dc reference voltages $V_{ref}$ and $(-V_{ref})$ by means of comparators 52 and 54. More specifically, the comparator 52 has one input terminal 52a connected to the output side of the integrator 50 and a second input terminal 52b connected to a reference voltage having a positive value. Similarly, the comparator 54 has one input terminal 54a connected to the integrator 50 and its second input terminal 54b connected to the reference voltage, the reference voltage having a negative value in this instance. In this way, the output terminals 54c and 52c of the two comparators 54 and 52 provide respective output signals $A_1$ and $A_2$.

For the sake of illustration:
If $V_I > V_{ref}$, then $A_1 = -5.0$ volts
If $V_I < V_{ref}$, then $A_1 = +0.7$ volts
Similarly:
If $V_I < (-V_{ref})$, then $A_2 = +5.0$ volts
If $V_I > (-V_{ref})$, then $A_2 = -0.07$ volts It should be noted that the times $A_1 = -5.0$ volts and the times $A_2 = +5.0$ volts do not occur simultaneously. Therefore, by means of a third comparator having a first input terminal 56a connected to the output terminal 52c and a second input terminal 56b connected to the output terminal 54c, an output voltage $A_3 = +5.0$ volts, as an example, when $A_1 = -5.0$ volts appears at its output terminal 56c and $A_3 = -5.0$ volts appears at the output terminal 56c of the output terminal 52c and a second input terminal 56b connected to the output terminal 54c when $A_2 = +5.0$ volts; otherwise, $A_3 = 0$.

Two light emitting diodes 58, 60 are connected to the output terminal 56c of the comparator 56 and are responsive to the output signal $A_3$, the diode 58 conducting when $A_3 = +5.0$ volts and the diode 60 conducting when $A_3 = -5.0$ volts.

The LEDs 58 and 60 are optically coupled to light activated thyristors 62 and 64, respectively. Consequently, when the triac 36a is not conducting and the voltage across it with respect to ground is positive, the light activated thyristor 62 has a forward voltage applied to it. Conduction of LED 58, under this condition, triggers the thyristor 62 into its conducting state, which as a consequence results in a flow of gate current for triac 36a, thereby triggering it into conduction. By the same token, when the voltage across the triac with respect to the neutral 24 is negative, conduction of LED 60 triggers the thyristor 64 and the triac 36a into their conducting state.

Recapitulating, when the ac voltage peak of the signal $V_i$ ($V_i$ being proportional to the load voltage $V_a$ of the output terminal 28a) is less than $V_{ref}$, the triac 36a is not triggered. The same condition applies for the triacs 36b and 36c and as a consequence the capacitor excitation for the induction generator 18 is equal to the vars supplied by the capacitors 32a, 32b and 32c.

On the other hand, when the ac voltage peak, more specifically the voltage $V_i$ derived therefrom, exceeds $V_{ref}$, current flows through the inductors 34a, 34b and 34c because of the serial connection of the inductors 34a, and 34b and 34c with their associated triacs 36a, 36b and 36c. Of course, the generator 18 is a three-phase generator and the inductor currents just mentioned are displaced by 120 degrees in phase with respect to each other.

Therefore, it should be appreciated that whatever current flows through an inductor 34a, 34b or 34c at any moment reduces the effective capacitor-excitation and hence controls the output voltages $V_a$, $V_b$ and $V_c$ at the terminals 28a, 28b and 28c. Stated somewhat differently, the inductor current increases with the value of the ac voltage peak because the triacs are conductive during a greater portion of each half cycle in which conduction occurs. As indicated above, the greater the inductor current, the less the capacitively supplied excitation with the result that the output voltage is controlled within desired limits.

As already indicated, the logic circuits 40b and 40c are identical to the control circuit 40a. In this way, the capacitive excitation for all three phases of the three-phase system 10 is controlled.

Inasmuch as our invention will find especial utility in supplying electric power for residential space heating and hot water heating, the resistive heating load is generally denoted by the reference numeral 66, being composed of individual resistance elements 66a, 66b and 66c. These elements 66a, 66b and 66c are Y-connected, one end of each being joined together and grounded at 68, and the other ends being connected to the stator terminals 28a, 28b and 28c, respectively, via the switch contacts 30a, 30b and 30c. For the sake of facile presentation, the resistance elements may be considered to be used for space heating purposes. A house 70 containing the resistance load 66 therein is depicted in FIG. 1. These elements 66a, 66b and 66c of the load 66 may be in the form of appropriately located baseboard heaters which provide heat for the house 70 to whatever extent the power derived from the wind affords. When the generated power is inadequate for the house 70, then the thermostatically controlled heating system, whether gas, oil or electric, already installed in the house adds to the house heat obtained via the elements 66a, 66b and 66c. Consequently, the main gas, oil or electric heating system supplies less heat and a saving in fuel is realized. The resistance elements 66a, 66b and 66c can be used to heat water instead of serving as a space heater.

During high wind speeds, the three-phase output voltage $V_a$, $V_b$ and $V_c$ cannot be maintained below an allowable maximum value by controlling the triacs 36a, 36b and 36c. Reference has already been made to the disconnect switch or circuit breaker 30 and its operating rod 31. To open the circuit breaker 30, and hence the three sets of contacts 30a, 30b and 30c, an electromagnet 72 is employed as part of the circuit breaker 30, the electromagnet comprising a coil 72a and armature 72b, the coil 72a when energized pulling or attracting the armature 72b downwardly as viewed in FIG. 2, along with the operating rod 31 with its normally closed contacts 30a, 30b and 30c. With the normally closed contacts 30a, 30b and 30c pulled open, the capacitors 32a, 32b and 32c and the resistive load 66 are completely isolated from the generator 18, thereby avoiding any electrical overloading of the system under extreme wind velocities.

Although various wind-measuring devices are available, our invention lends itself readily to using a plate anemometer diagrammatically pictured and denoted by the reference numeral 76. The anemometer 76 includes a pivotally mounted or suspended plate 78 against which the wind blows, as indicated by the arrow 80. When the wind speed becomes excessive the biasing action of a coil spring 82 is overcome so that the suspended plate 78, which is grounded at 84, pivots in a counterclockwise direction to engage a contact 86 and thereby connect a power supply 88 to the coil 72a of the electromagnet 72. Energization of the coil 72a in this manner opens the circuit breaker 30 to disconnect the capacitors 32a, 32b and 32c and the resistance 66a, 66b and 66c from the generator 18.

Stated somewhat differently, the permissible maximum value of the wind speed, as determined by the deflection of the pivotal plate 78, is set so as to impose a maximum limit on the supply of reactive vars from the inductors 34a, 34b and 34c, as well as to limit the output voltage $V_a$, $V_b$ and $V_c$ at the terminals 28a, 28b, 28c of the generator 18 to a predetermined value.

Provision is also made for isolating or disconnecting the capacitors 32a, 32b, 32c and resistive load 66 comprising the resistances 66a, 66b, 66c from the generator 18 when the wind speed has dropped to a predetermined minimum value. This is done to prevent the loss of self-excitation which in some instances can also lead to the loss of residual magnetism, as far as the generator 18 is concerned. To achieve this, the anemometer 76 is provided with a second contact 90 against which the plate 78 is urged by the spring 82 when the wind speed has dropped to an insufficient magnitude. As with the contact 86, the contact 90 is connected in circuit with the power source 88 to energize the coil 72a of the electromagnet 72 under minimum wind conditions, as well as for maximum wind speeds.

In other words, the circuit breaker 30 is closed only when the wind swings the plate 78 to positions intermediate the contacts 86, 90 so that neither contact 86 nor 90 is engaged by the plate 78. The contacts 30a, 30b and 30c, during an acceptable range of wind speeds, are closed, thereby connecting the excitation capacitors 32a, 32b, 32c and the resistances 66a, 66b and 66c to the generator 18.

In order to ensure that the induction generator 18 self-excites once it is being driven at or above the lowest acceptable speed determined by the anemometer 76, a small dc voltage is applied across two phases of the generator 18, that is across the windings 22b and 22c, when the generator 18 is isolated from the rest of the system by virtue of the circuit breaker 30 being open as a result of the plate 78 engaging the contact 90 to energize the coil 72a. To provide the magnetization a dc power source 92 is connected in series with a relay 94 having a coil 94a and contacts 94b which are held closed when the relay coil 94a is energized. The coil 94a is energized through the agency of a power source 96 when the plate 78 of the anemometer 76 is in engagement with the contact 90.

Various ways can be employed for energizing the electromagnet 72 and the relay 94. Mainly, the particular way will depend to some extent on the type of anemometer. While more sophisticated than the plate type, a number of cup-type anemometers will small generators coupled thereto can be employed, the generator producing a low voltage representative of the acceptable minimum wind speed and a higher voltage in accordance with the permissible maximum wind speed. Such anemometers lend themselves readily to the employment of logic circuitry in contradistinction to the electromagnetic means that has been schematically portrayed in FIG. 2.

The capacitors 32, inductors 34, triacs 36, logic circuits 40 and restoring circuit 92, 94 can all be contained in a single casing 100 which can be located in the dwelling 70, as illustrated in FIG. 1. For the sake of simplicity, a single cable 102 has been shown which contains the power lines connecting the generator 18 to the resistive load 66 plus the control wiring associated with the anemometer 76. The cable 102 leads to the top of a tower 104 where the wind turbine 12, generator 18 and anemometer 76 are mounted. More specifically, the components 12, 18 and 76 are supported on a turntable 106 comprising a fixed plate 108 and a rotatable plate 110. By means of a vane 112 attached to the rotatable plate 110, the wind turbine 12 and anemometer 76 are turned so that the constantly face whatever wind prevails.

We claim:

1. A wind energy conversion system comprising a variable-speed wind turbine, an induction generator including a stator and a squirrel-cage rotor, said rotor being coupled to said turbine so as to rotate in accordance with the speed of said turbine, capacitor means connected to said stator for supplying excitation current to said generator, means for varying the amount of excitation current supplied by said capacitor means in accordance with the difference between the output voltage from said stator and a reference voltage, and an electrically isolated resistive load means of fixed resistive value connected to said stator and capacitor means, said resistive load means constituting a fixed resistance for heating purposes only which is substantially independent of the voltage generated by said generator and also substantially independent of the changes in frequency resulting from a relatively wide range of turbine speed changes caused by widely changing wind velocities.

2. A wind energy conversion system in accordance with claim 1 in which said capacitor means includes a capacitor connected to said stator, and said current-varying means includes an inductor and a device for changing the amount of current flowing through said inductor, said inductor and current-varying device being connected in series.

3. A wind energy conversion system in accordance with claim 2 including means for supplying a control signal to said device, said control signal being representative of the difference between the output voltage from said stator and said reference voltage to cause said excitation current to vary in accordance with said difference between said output voltage and said reference voltage, the value of said reference voltage being selected so as to limit the output voltage from said generator to a safe value.

4. A wind energy conversion system in accordance with claim 3 in which said device includes a triac.

5. A wind energy conversion system in accordance with claim 4 in which said means for supplying a control signal includes a logic circuit for controlling said triac in accordance with said difference between said output voltage and said reference voltage.

6. A wind energy conversion system comprising a wind turbine, an induction generator including a stator and a squirrel-cage rotor, said rotor being coupled to said turbine, capacitor means connected to said stator for supplying excitation current to said generator, said capacitor means including a capacitor connected to said stator, resistive load means connected to said stator and capacitor means, means for varying the amount of excitation current supplied by said capacitor means, said current-varying means including an inductor and a triac for changing the amount of current flowing through said inductor, said inductor and current-changing triac being connected in series, and means for supplying a control signal to said triac representative of the difference between the output voltage from said stator and a reference voltage, said means for supplying a control signal including a pair of light-activated thyristors connected to said triac, a light emitting diode optically coupled to each of said thyristors, one of said light emitting diodes, when conducting, triggering one of said thyristors into its conducting state, and the other of said light emitting diodes, when conducting, triggering the other of said thyristors into its conducting state, and means for comparing a voltage proportional to said output voltage with said reference voltage to cause said one light emitting diode to conduct when said proportional voltage is greater than a positive value of said reference voltage and to cause said other light emitting diode to conduct when said proportional voltage is greater than a negative value of said reference voltage.

7. A wind energy conversion system in accordance with claim 6 in which said means for supplying a control signal includes a voltage divider for providing said proportional voltage.

8. A wind energy conversion system in accordance with claim 7 including an integrator connected between said voltage divider and said comparing means.

9. A wind energy conversion system in accordance with claim 8 in which said comparing means includes a first comparator having a first input terminal connected to said integrator and a second input terminal connected to said reference voltage having said positive value, a second comparator having a first input terminal connected to said integrator and a second input terminal connected to said reference voltage having said negative value, said first and second comparators each having an output terminal, and a third comparator having a first input terminal connected to the output terminal of said first comparator and a second input terminal connected to the output terminal of said second comparator, said third comparator having an output terminal connected to said light emitting diode.

10. A wind energy conversion system comprising a wind turbine, an induction generator including a three-phase stator having a winding for each phase and a squirrel-cage rotor coupled to said turbine, capacitor means connected to said stator including three capacitors, one for each phase, for supplying excitation current to said generator, said stator windings being Y-connected and said capacitors being delta-connected to said Y-connected windings, resistive load means connected to said stator and capacitor means, said resistive load means including three resistance elements and said resistance elements being Y-connected to said delta-connected capacitors, and means for varying the amount of excitation current supplied by each of said capacitors including three inductors and three triacs, one of each of said inductors and one of each of said triacs being connected in series with each other and each serially connected inductor and triac being connected in parallel with one of said stator windings, and means for causing conduction of each triac in accordance with the difference in output voltage from said stator and a reference voltage, whereby an increase in the flow of current through said inductors produces an effective reduction in excitation current by reason of the out-of-phase relation of the inductor current with the capacitor current.

11. A wind energy conversion system comprising a wind turbine, an induction generator including a stator and a squirrel-cage rotor, said rotor being coupled to said turbine, capacitor means connected to said stator for supplying excitation current to said generator, resistive load means connected to said stator and capacitor means, switch means for disconnecting said capacitor means and said load means from stator, and means responsive to wind speed for causing said switch means to disconnect said capacitor means and load means from said stator when the wind speed is below a predetermined low speed.

12. A wind energy conversion system in accordance with claim 11 including means controlled by said wind responsive means for applying a dc voltage to said stator when said wind responsive means causes said switch means to disconnect said capacitor means and load means so as to insure self-excitation of said generator when said switch means reconnects said capacitor means and said load means to said stator.

13. A wind energy conversion system in accordance with claim 11 in which said means responsive to wind speed also causes said switch means to disconnect said capacitor means and load means from said stator when the wind speed is above a predetermined high speed.

14. A wind energy conversion system comprising a wind turbine, an induction generator including a stator and a squirrel-cage rotor, said rotor being coupled to said turbine so as to rotate at whatever speed said turbine rotates, capacitor means located adjacent said generator and connected to said stator for supplying excitation current to said generator, means including a logic circuit for varying the amount of excitation current supplied by said capacitor means, and resistive load means having a fixed resistance value connected to said stator and capacitor means, said load means being spaced from said generator and being the only load means connected to said stator and capacitor means and thus independent of voltage and frequency so that the speed of said wind turbine can vary over a relatively wide range without adversely affecting the efficient operation of said induction generator.

15. A wind energy conversion system in accordance with claim 14 including a building spaced from said wind turbine, said logic circuit and resistive load means being located in said building and said load means including a heating element, and a cable extending directly from said stator to said heating element containing power lines so that power is supplied directly from said generator to said resistive load means, said cable also including control wiring extending from said logic circuit to said capacitor means.

* * * * *